US009292597B2

(12) United States Patent
Luo et al.

(10) Patent No.: US 9,292,597 B2
(45) Date of Patent: Mar. 22, 2016

(54) SMART QUESTION ROUTING AND ANSWERER GROWING FOR ONLINE COMMUNITY QUESTION-ANSWER SERVICES

(71) Applicant: International Business Machines Corporation, Armonk, NY (US)

(72) Inventors: Lin Luo, Beijing (CN); Fei Wang, San Jose, CA (US); Michelle X. Zhou, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 217 days.

(21) Appl. No.: 14/061,804

(22) Filed: Oct. 24, 2013

(65) Prior Publication Data

US 2015/0120718 A1    Apr. 30, 2015

(51) Int. Cl.
*G06F 7/00* (2006.01)
*G06F 17/30* (2006.01)

(52) U.S. Cl.
CPC .............................. *G06F 17/30699* (2013.01)

(58) Field of Classification Search
CPC .......... G06F 17/30008; G06F 17/3053; G06F 17/3064; G06F 17/30693; G06F 17/30953; G06F 15/16; G06F 15/17312; G06F 3/01; G06F 17/30637; G06F 17/30699; G06Q 10/04; G06N 5/00; G06N 5/02
USPC ......... 707/703, 721, 726, 732, 748, 749, 751, 707/758, 766, 767, 768, 771, 777, 780, 782, 707/802, 608, 769, 805; 709/224; 715/753, 715/751; 706/46; 705/300
See application file for complete search history.

(56) References Cited

U.S. PATENT DOCUMENTS

| 8,266,207 | B2 * | 9/2012 | Dugan .......................... 709/204 |
| 8,484,181 | B2 * | 7/2013 | Levin et al. ................... 707/706 |
| 2010/0070554 | A1 * | 3/2010 | Richardson et al. .......... 709/202 |
| 2010/0268716 | A1 | 10/2010 | Degaugue et al. |
| 2011/0307498 | A1 | 12/2011 | McFarlane et al. |
| 2012/0233020 | A1 * | 9/2012 | Eberstadt et al. .......... 705/26.41 |
| 2012/0246578 | A1 | 9/2012 | Baldwin et al. |

(Continued)

OTHER PUBLICATIONS

Zhou et al., Routing Questions to the Right Users in Online Communities, Junjie Yao Data Engineering, 2009. ICDE '09. IEEE 25th International Conference on Year: 2009, pp. 700-711, DOI:10.1109/ICDE.2009.44.*

(Continued)

*Primary Examiner* — Greta Robinson
(74) *Attorney, Agent, or Firm* — Maeve McCarthy

(57) ABSTRACT

A computer processor accesses QA forum activity associated with users of a QA forum, wherein the QA forum activity contains historical questions, historical answers, and profiles, each having elements including QA forum information. The processor accesses historical online social activity corresponding to the users of the QA forum, each historical online social activity having elements including at least social activity information. The processor performs a first similarity calculation and selects an at least one model answerer based on the similarity between elements of a question on the QA forum, and the elements of the QA forum activity associated and corresponding to each of the users of the QA forum. Based on a second similarity calculation, the processor determines a similarity between the QA forum user elements and the at least one model answerer elements, and identifies at least one prospect answerer from the QA forum users.

18 Claims, 4 Drawing Sheets

(56) References Cited

U.S. PATENT DOCUMENTS

2012/0272164 A1 10/2012 Polonsky et al.
2013/0013546 A1 1/2013 Bagchi et al.

OTHER PUBLICATIONS

Furlan et al., A Survey of Intelligent Question Routing System, Intelligent Systems (IS), 2012 6th IEEE International Conference, pp. 14-20, 2012, DOI:10.1109/IS.2012.6335784.*

Fang et al., "Question routing in community based QA: incorporating answer quality and answer content", SIGKDD-MDS' 12, 8 pps., 2012.

Li et al., "Routing questions to appropriate answerers in community question answering services", CIKM 2010, Oct. 26-30, 2010, pp. 1585-1588.

Li et al., "Question Routing in Community Question Answering: Putting Category in Its Place", CIKM 11, 4, Oct. 24-28, 2011.

Liu, Q. et al.; "Modeling Answerer Behavior in Collaborative Question Answering System"; Advances in Information Retrieval. Proceedings of 33rd European Conference on IR Research, ECIR 2011, pp. 67-79; 2011.

Roberts, I.; "Information Retrieval for Question Answering"; Dissertation for the Master of Science in Advanced Computer Science, City University, London England; Aug. 2002.

Zhou, TC. et al.; "A Classification-based Approach to Question Routing in Community Question Answering"; International World Wide Web Conference Committee (IW3C2); CQA2012, a WWW'2012 Workshop, Apr. 17, 2012.

Zhou, M. et al.; "Smart Social Q&A"; IBM Corporation; Smart Social Q&A application in IBM Connections, v4. IBM Center for Social Business; 2012 <www.research.ibm.com/social/projects.social/socialandashtml.>.

* cited by examiner

SMART QUESTION ROUTING AND ANSWERER GROWING FOR ONLINE COMMUNITY QUESTION-ANSWER SERVICES

BACKGROUND OF THE INVENTION

Embodiments of the present invention relate generally to the field of online collaboration, and more particularly to growing effective prospect answerers for community question-answer services.

Text-based communications utilizing the Internet have gained substantial popularity. One particular area of growth has been in the collaborative question-answer (cQA) services, sometimes referred to as community question-answer (QA) services. Internet sites providing question-answer services, hereafter referred to as "QA sites", make use of the collective knowledge of very large groups of users, offering an efficient means to obtain answers to questions, and opportunities for users with expertise to voluntarily share their knowledge on a larger scale.

To identify users that consistently provide high quality answers to questions, hereafter referred to as answerers, QA sites enable question askers to accept answers provided, and many cases readers are able to "vote" for the "best answer" provided for an asked question. The use of large numbers of users to provide feedback on answers provides a quality check, and use of point systems by many QA sites effectively distinguishes answerers with expertise in various topics that frequently respond to questions.

Although a large number of users are registered with QA sites, data analysis typically indicates that a majority of questions are answered by a small number of answerers. In fact, most answerers have typically answered only one asked question. For QA sites to be responsive and effective, efforts have been taken to better direct questions of certain topics to answerers that have a demonstrated history of expertise and responsiveness in the topic areas. Although logical, this places increased demands on the smaller number of answerers that provide the majority of answers, and ignores the likelihood that answerers may not consistently be available or willing to respond to questions.

As QA sites grow with respect to users posting more questions, delays in response to answering questions or unanswered questions may show similar growth. Efforts to improve response to questions by routing topic-specific questions to expert-level answerers may reduce the inefficiencies of question discovery, but answerers may react negatively. The increasing number of questions pushed to them, inadequate filtering of topics matching answerers' expertise, and inconsideration of availability, may influence answerers to reduce or stop answering questions altogether.

SUMMARY

Embodiments of the present invention disclose a method, computer program product, and system for identifying at least one prospect answerer for a question on a question-answer (QA) forum. A computer processor accesses QA forum activity associated with users of a QA forum, wherein the QA forum activity contains historical questions, historical answers, and profiles, each having elements including QA forum information. The computer processor accesses historical online social activity corresponding to the users of the QA forum, each historical online social activity having elements including at least social activity information. The computer processor determines, based on performing a first similarity calculation, a similarity between elements of a question on the QA forum, and the elements of the QA forum activity associated with each of the users of the QA forum and the elements of the historical online social activity corresponding to each of the users of the QA forum. The computer processor selects, based on results of the first similarity calculation, at least one user of the QA forum as an at least one model answerer, wherein elements associated with and corresponding to the at least one model answerer are similar to the elements of the question. The computer processor determines, based on performing a second similarity calculation, a similarity between the elements associated with and corresponding to each of the users of the QA forum other than the at least one model answerer, and the elements associated with and corresponding to the at least one model answerer, and the computer processor identifies, based on results of the second similarity calculation, at least one prospect answerer amongst the users of the QA forum, wherein elements associated with and corresponding to the at least one prospect answerer are similar to the elements associated with and corresponding to the at least one model answerer.

DETAILED DESCRIPTION

Figure 1:
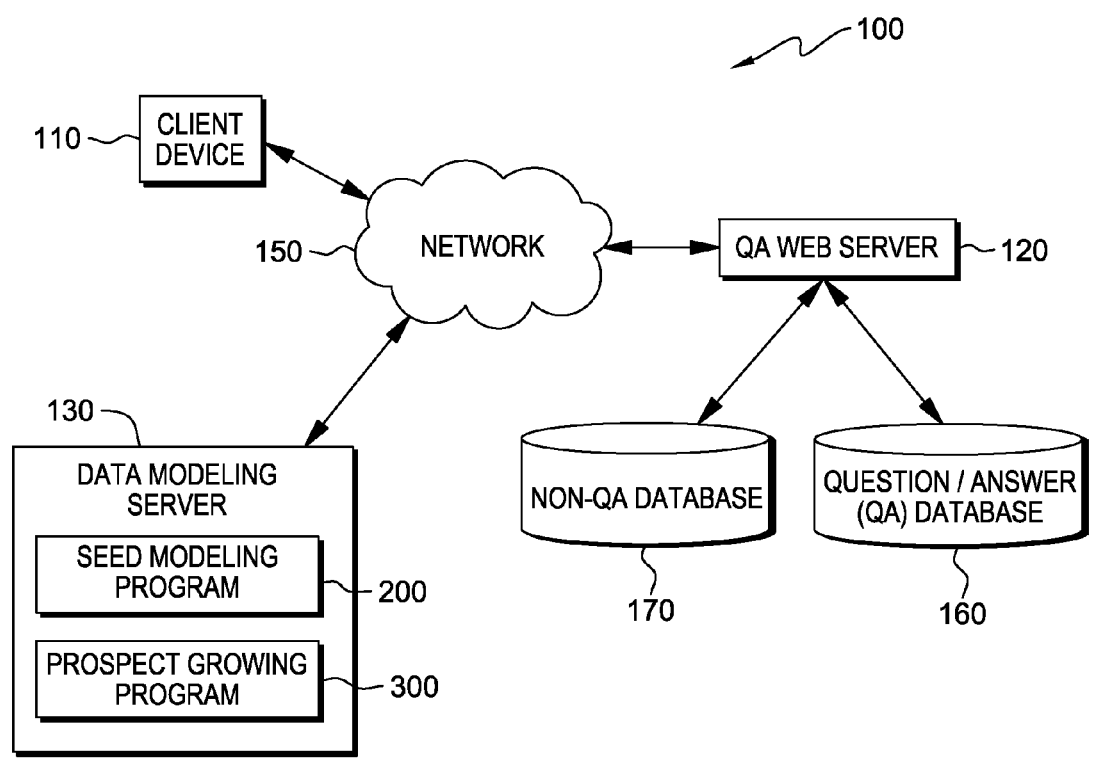
FIG. 1 is a functional block diagram illustrating a distributed data processing environment, in accordance with an embodiment of the present invention.

Embodiments of the present invention recognize that online question-answer (QA) forums offer "asking-users" access to other "answering-users" that share knowledge, experience, and expertise by answering posted questions. Embodiments of the present invention additionally recognize that QA forums experience a low percentage of users that actively respond to a high percentage of the posted questions, and efforts to route questions to qualified answerers results in a shortage of answerers and an over-burdened situation for active answerers. Start-up QA forums lack answer history and have difficulty identifying qualified answerers to which questions can be directed. Such situations can result in delays in providing answers and discourage user confidence and participation.

Embodiments of the present invention use existing QA data from QA forum answering history, as well as attributes of social networking content and profile information, to develop a predictive model of the attributes of answerers. Hereafter "attributes" may also be referred to as features or "elements" associated with questions, historical questions, historical answers, user profiles, and historical online social activity. Embodiments further determine similarity between users that answered a question, and similarity between the elements of a question and elements of the text content of a user's answer, to identify model answerers to which the question can be forwarded. The model answerers are considered exemplary answerers for a given question or question type, and are identified to serve as "seed" answerers and the elements and answering behaviors of a seed answerer are compared to inactive or low-activity users to identify prospect answerers that may be "grown" to fully active answerers and potentially model answerers, or "seeds".

History data for users of a QA site as well as non-QA social data are used to determine the ability, willingness and readiness, or availability of each user of the QA site. Similarity measurements are made between elements of a question and elements of a user's answer to determine the ability of the user to answer a type of question. Willingness is predicted by answering history and non-QA social behavior indicators. Availability is determined by recency of activity, recency of posting an answer and the rate of questions answered for a defined period of time. For each user, a probability is determined for answering a question of a topic. The probability is used to determine "seed" answerers, with the highest probability scores corresponding to the best seed for a question topic.

Similarity distance measurements are performed between prospect answerers, (non-seed users that have low levels of QA data), and seed answerers, to determine prospect answerers that have answer behaviors most similar to the seed answerers. The prospect answerers, along with the seed answerers, are forwarded questions, thus improving the routing of questions and growing prospect answerers towards demonstrating higher levels of expertise.

Implementation of such embodiments may take a variety forms, and exemplary implementation details are discussed subsequently with reference to the FIGS.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

FIG. 1 is a functional block diagram illustrating a distributed data processing environment, generally designated 100, in accordance with one embodiment of the present invention. Distributed data processing environment 100 includes client device 110, question-answer (QA) web server 120, data modeling server 130, shown hosting seed modeling program 200 and prospect growing program 300, question-answer (QA) database 160, non-question-answer (QA) database 170, all interconnected via network 150.

Network 150 can be, for example, a local area network (LAN), a wide area network (WAN) such as the Internet, or a combination of the two, and can include wire or wireless connections. In general, network 150 can be any combination of connections and protocols that will support communications via various channels between client computer 110, QA web server 120, data modeling server 130, QA database 160 and non-QA-database 170, in accordance with an embodiment of the invention. In one embodiment of the present invention, client device 110, and storage device 130 may be physically integrated into a single computing system, in which case network 150 represents a system bus, connecting components of the computing system and enabling communications between components.

Client device 110 is a computing device capable of accessing and posting content on QA-type forums that operate on QA web server 120. Client device 110 represents one of a plurality of computing devices operated by users to post questions, post answers, or to post comment responses to questions, and to view questions, answers, and comments. Client device 110 may be a desktop computer, laptop computer, a specialized computer server, a client computer, tablet, or netbook personal computer (PC), a personal digital assistant (PDA), a smart phone, a mainframe computer, or a networked server computer. Further, client device 110 can be a computing system utilizing clustered computers and components to act as single pools of seamless resources when accessed through network 150, as is common in data centers and with cloud computing applications. In general, client device 110 is representative of any programmable electronic device or combination of programmable electronic devices capable of executing machine-readable program instructions. Client device 110 may include internal and external hardware components, as depicted and described in further detail with respect to FIG. 4.

QA web server 120 is a server computer that hosts one or more question-answer type web-based forums. QA web server 120 is accessible by client computing devices, such as client device 110, via connection to network 150. QA web server 120 includes content and programmable instructions enabling users operating client devices, such as client device 110, to post questions, respond to questions with answers and/or comments, and view questions, answers, and comments. QA web server 120 also collects and stores QA data on QA database 160 via network 150. QA data may include, but is not limited to: historical questions, historical answers, QA user profiles, and historical online social activity associated with users of the QA forum.

The historical questions, historical answers, and profiles of the QA forum users, include elements comprised of the text and content of: the titles and details of the questions, the answers, the profiles, and QA forum information. The QA forum information can include, but is not limited to: number of answers provided, types, topics, or categories of questions answered, number of "best answers", response time of answers, other forums or communities the user follows or participates in, interests, and achievements attained with respect to the QA forum. The historical online social activity corresponding to the QA forum users includes elements comprised of: the number and content of postings, comments, edits, and tags, of other online social sites, profiles from other social sites, and titles or achievements from other social sites.

QA web server 120 may be a desktop computer, laptop computer, a specialized computer server, a client computer, tablet, or netbook personal computer (PC), a personal digital assistant (PDA), a smart phone, a mainframe computer, a web server computer, or a networked server computer. Further, QA web server 120 can represent computing systems utilizing clustered computers and components to act as single pools of seamless resources when accessed through network 150, as is common in data centers and with cloud computing applications. In general, QA web server 120 is representative of any programmable electronic device or combination of programmable electronic devices capable of executing machine-readable program instructions. QA web server 120 may include internal and external hardware components, as depicted and described in further detail with respect to FIG. 4.

QA database 160 is a tangible digital storage device, storing data in a searchable database associated with questions, answers to questions, comments, user profiles, user-based metrics including the number of answers posted, answers accepted and best answer acknowledgements. QA database 160 is accessible by QA web server 120 and data modeling server 130 via network 150. In another embodiment, QA database 160 is an integral component of QA web server 120 or an integral component of data modeling server 130, in which case network 150 may include a communications bus within the respective server.

Non-QA database 170 is a tangible digital storage device, storing data in a searchable database that includes, but is not limited to: each QA forum user's online social activity content, the number of communities to which each user is a member, the number of visits each user makes to selected social sites, the number of posts made, the number of replies to other posts, the number of tags each user has made to other users' entries, the number of tags others have assigned to each user, the number of "friends" each user has in a social network, and the number of "followers" each user has within social communities.

Embodiments of the present invention include the non-QA database element data as additional modeling elements for QA forum users that answer questions, also referred to as answerers, which may be selected as high-quality model answerers, or also referred to as "seed" answerers. The non-QA elements of high-quality answerers are compared to low-activity user prospects to identify potential quality answerers.

Data modeling server 130 is a server computer that hosts and operates seed modeling program 200 and prospect growing program 300. Data modeling server 130 has access to QA data within QA database 160 and non-QA data within non-QA database 170, via network 150. Data modeling server 130 may be a desktop computer, laptop computer, a specialized computer server, a client computer, tablet, or netbook personal computer (PC), a personal digital assistant (PDA), a smart phone, a mainframe computer, a web server computer, or a networked server computer. Further, data modeling server 130 can represent computing systems utilizing clustered computers and components to act as single pools of seamless resources when accessed through network 150, as is common in data centers and with cloud computing applications. In general, data modeling server 130 is representative of any programmable electronic device or combination of programmable electronic devices capable of executing machine-readable program instructions. Data modeling server 130 may include internal and external hardware components, as depicted and described in further detail with respect to FIG. 4.

Seed modeling program 200 models the users of a QA forum using QA activity and non-QA activity data elements accessed from QA database 160 and non-QA database 170, respectively. In an alternate embodiment of the present invention, seed modeling program 200 includes modeling the users of a plurality of QA forums, and for new or "cold-start" QA forums, QA data from other QA forums may be used to obtain answerer and user modeling results. Seed modeling program 200 considers three components in modeling users, which includes elements of a user's ability to answer a given question, elements of the user's willingness to respond to the question and elements of a user's readiness or availability to respond to the given question. Each component includes multiple elements, the data of which are used to train the model for determining a "seed" answerer, also referred to herein as a model answerer. In one embodiment the modeling uses a binomial logistic regression technique, producing probability values as an outcome, and indicating the level of contribution of the elements in predicting a user's ability, willingness, and readiness to answer a question.

Seed modeling program 200 uses a similarity calculation, for example a cosine similarity calculation, between the parsed text content of a question title and question details, and the parsed text content and QA forum history of historical questions, historical answers, profiles, posted by users of (answerer) a QA forum, and historical online social activity, to determine the ability of each user of a QA forum to answer a given question. Willingness is determined by considering the number of answers a user has provided, the number of postings a user has made, and other elements such as personality indicators from analysis of a user's responses and comments. Readiness is determined by the status and availability of a user which may be available in profile information, or may include use of response time analysis from response history. The modeling of users includes creating categories of answerers, distinguishing the answerers' level of activeness in answering posted questions, such as the number of answers provided and the number of accepted answers of the answers provided.

It should be noted that the term "users" refers to those who post questions, answer or otherwise respond to questions, comment on questions or answers, view or follow topics, or have association with a QA forum or QA site. The term "answerer" refers to users that have answered posted questions. Active answerers are those users that have answered multiple questions and have answered at least one question recently. Inactive answerers may have answered few questions, typically answering only one or two, and may include answerers that have not answered any questions recently. Answerers are users, but all users are not answerers; similarly, all answerers are not active answerers.

Seed modeling program 200 matches user models to new questions to produce a ranked candidate list of answerers for each new question, using text analysis technology. From the ranked list of answerers, one or more answerers are identified having elements resulting in high levels of ability, willingness and readiness, to answer the question. The elements, including the non-QA elements of the identified answerers, are used to identify users as prospect answerers as discussed below in the context of prospect growing program 300. The answerers selected from the ranked list to be used to identify prospects are referred to as model answerers, "seed" answerers, or seeds.

Having identified one or more seed answerers for a question, prospect growing program 300 uses the element information from seed modeling program 200 to perform a similarity distance calculation between each selected seed answerer for a question and the non-seed-answerer user population. Prospect growing program 300 determines a pair-wise similarity between answerers for questions in the QA data having more than one answerer. Prospect growing program 300 calculates a distance between answerers of a question, using the elements (parsed content text and parsed QA forum information of the historical questions, historical answers, profiles, of the QA forum users, and parsed content text and social activity information of historical online social activity) described above. The pair-wise similarity calculations are used to train the weights of the elements of a similarity model discussed in greater detail below. In one embodiment the model weights may be trained using supervised learning techniques. Weights may be controlled or adjusted with dependence upon the question type. For example, some posted questions that are general in nature can be answered by a large number of answerers, and many of the answerers' elements may not distinguish their ability to answer the question, whereas questions that are very specific, technical or complex may show a stronger distinction of element differences among answerers.

Prospect growing program 300 determines the user(s) that most closely match a seed answerer for a given new question, and includes the user(s) in determining answerers to which the question may be routed. In this manner the answerer population is enabled to grow and prospect answerers are included in question routing, potentially reducing the demand on active seed answerers. The elements of users are updated based on actions taken by users to which questions are routed, improving the model over time.

Figure 2:
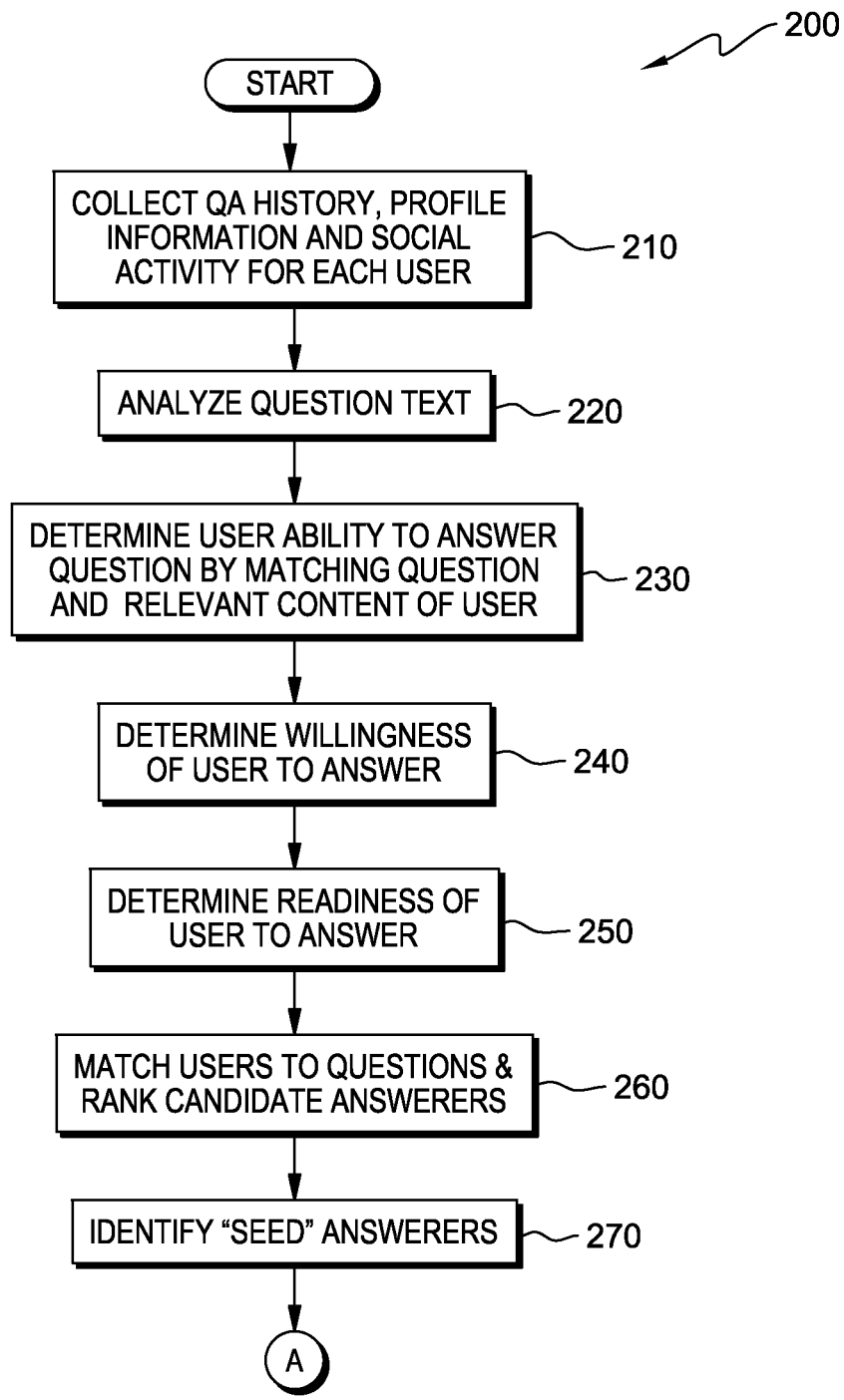
FIG. 2 is a flowchart depicting the operation of a seed modeling program, on a server computer within the data processing environment of FIG. 1, in accordance with an embodiment of the present invention.

FIG. 2 is a flowchart depicting the operation of seed modeling program 200, in accordance with an embodiment of the present invention. Seed modeling program 200 accesses collected QA history, profile information, and social activity data for each user of a QA forum (step 210). The collected QA history and user information is used to determine question elements and user elements from the content of answers and comments of users, as well as question-user interactions, to obtain elements that can be used for similarity comparisons.

For example, seed modeling program 200 accesses QA database 160 and non-QA database 170 to obtain QA history, profile information and additional social activity for users of the QA forum. The QA history includes in part, the content of the title, question detail, tags, asker identification, and asker information, for the question, and also includes the author, answer detail, and tags of the answer for all users of the QA forum. The profile information includes user specific information and may include a brief bio, interest topics, community memberships, and achievement levels of answering support. The social activity includes text content and associations outside of the QA forum and may at include, but is not limited to: frequency of posts, comments, edits, and replies.

Seed modeling program 200 analyzes question text to determine topics and key terms and phrases associated with question history (step 220). The title and content text of the question are analyzed by seed modeling program 200 to determine key words, phrases, as well as information associated with the asker, such as their forum ID, location, organization, and available community affiliations that may contribute to the "willingness" of an answerer to respond. The analyzed text content is used to determine question type and topic for similarity comparisons. For example, a question is posted in a QA forum by an asker and includes the asker's forum ID, location, and a message suffix indicating that the asker is a self-taught programmer. Seed modeling program 200 analyzes each word of the question title and text content of the question, and determines key words, combinations of words, and key phrases that may indicate the topic, level of detail or complexity, and information sought in an answer.

Seed modeling program 200 determines each user's ability to answer a question by matching a (new) question and the relevant content in the QA history of a user (step 230). Using the collected QA history, profile and social activity data, seed modeling program 200 analyzes the answer data and associates topics, key words and phrases, and profile information with each user of the QA forum. Seed modeling program 200 performs a similarity function matching question analytics and answer analytics of user relevant content to determine a user's ability to answer a question.

For example, having analyzed the content of a given question's title and detail, seed modeling program 200 performs a similarity function, for example a cosine similarity function, of parsed and identified key words and phrases of answers provided by each user. Similarity values are determined by comparing the parsed and identified key words and phrases between question content text and historical questions, answers, profiles content text, as well as parsed QA forum information. Results indicating a higher value or level of similarity indicate a higher level of ability to answer the question. In one embodiment of the present invention, the following equations represent a similarity approach to determine the ability of user to answer a given question or a type of question.

$$V_d = [w_{1,d}, w_{2,d}, \ldots, w_{N,d}]^T \quad (1)$$

In equation (1), $V_d$ is the term frequency-inverse document frequency (tf-idf) vector for a set of words $\{t_1, t_2, \ldots, t_N\}$ in document d.

$$w_{t,d} = tf_{t,d} * \log \frac{|D|}{|\{d' \in D \mid t \in d'\}|} \quad (2)$$

In equation (2), the term "$w_{t,d}$" is the tf-idf for a single word "t" in document "d", and is composed of the term frequency and the inverse document frequency. The term $tf_{t,d}$ is the number of times that the term "t" occurs in document "d". The idf term includes |D| representing the total number of documents in which the term "t" is being searched, considering the postings and online activity of a user as a collection of documents. The term |d∈D|t∈D}| is the number of documents in which "t" appears. Equation (3) is used to determine the score of the question-user (Q-U) matching, in which the first term is the normalized tf-idf vector of the question, treating the question as a document. The second term is the normalized tf-idf vector of all the documents composed by a user (u). The Q-U matching score is the inner product of the two vectors.

$$\frac{V(q)}{|V(q)|} * \frac{V(d, c)}{Norm_{user}} \quad (3)$$

Having determined an ability level of users to answer a question, seed modeling program 200 determines the willingness of users to answer the question (step 240). Historic behavior of the number of answers provided by the user, the frequency of the user to respond to the type of question, and the number of times the answerer has provided a "best answer" are part of the data used in determining the willingness of a user to respond to a question. Additionally, non-QA data associated with location, organization, community membership, and "friend" status of the asker and user may be included in determining the level of willingness of a user to answer a question, as well as the use of social network involvement and activity of the user in blogs, micro-blogs, other forums and communities.

For example, seed modeling program 200 determines the number of answers the user has provided from referencing the QA history, and determines if the user's currency in providing answers. Additionally, the number of "best answers" is also determined and applied to determining willingness to answer a question, since the "best answer" feedback may indicate to the user a higher level of expertise on the topic. Seed modeling program 200 also includes non-QA data associated with the asker and user's location, organization, community memberships and if there is a "friend" status indicated, such that commonality in the non-QA areas may have influence on the user's willingness to answer a question. Seed modeling program 200 also includes the non-QA data of the number of social network activities the user is involved with, such as blogs, micro-blogs, other forums, and communities; noting the posting, comment, edit and tagging activity by the user. Higher levels of involvement outside the QA site may indicate a higher level of willingness to respond to a question within the QA site.

Seed modeling program 200 determines the readiness of users to answer a question (step 250). A user may have a high level of ability to answer a question and be willing to answer a question, but the user's readiness to respond may be affected by absence, ability to be connected, or workload and priorities. Seed modeling program 200 includes indicators of the user's availability and readiness in considering routing of questions to answerers. Readiness elements may include the most recent activity of the user, the most recent answer, the duration of time between question posting and answer posting, number of questions routed to user per unit time, and profile or posting indication of absence or other priority. Readiness is included in determining routing of questions to answerers, but may not be included in seed answerer modeling.

Seed modeling program 200 matches users to questions and ranks candidate answerers (step 260). Using text analysis techniques, seed modeling program 200 determines the similarity between the analyzed elements of a question and the modeling results previously determined from the elements of the QA activity associated with the users of the QA forum, and the elements of the historical online social activity corresponding to each user of the QA forum, described above. The similarity, or matching score, is used to rank the users for a given question.

For example, seed modeling program 200 compares the analyzed text of a question title and the analyzed text of the question detail to the answer history associated with each answering user, and compares non-QA elements of the question and asker, to the non-QA elements corresponding to each answering user. The similarity comparison of the question and modeling of the answering user results in a matching score. The matching scores of answerers are sorted to enable selection of candidate seed answerers, or otherwise referred to as model answerers.

Ranking of the scores matching questions to answering users enables seed modeling program 200 to identify seed answerers (step 270). From the candidate ranking of answerers, seed modeling program 200 selects a previously designated number of seed answerers. In one embodiment of the present invention, the previously designated number of seed answerers to be selected is defined by an administrator role of seed modeling program 200 in a setup file. In another embodiment, seed modeling program 200 may incrementally select the answerer with the highest matching score, followed by the next-highest matching score, until a desired result of prospect answerers is obtained (discussed further with respect to FIG. 3).

Having made the selection of one or more answerers to use as seed answerers for a question, seed modeling program 200 sends the identification of the seed answerers to prospect growing program 300, transfers control to prospect growing program 300, and ends. Seed answerers are highly suitable candidates to whom the question can be routed, but in embodiments of the present invention, elements of seed answerers are used to identify prospect answerers and grow the answerer pool.

Figure 3:
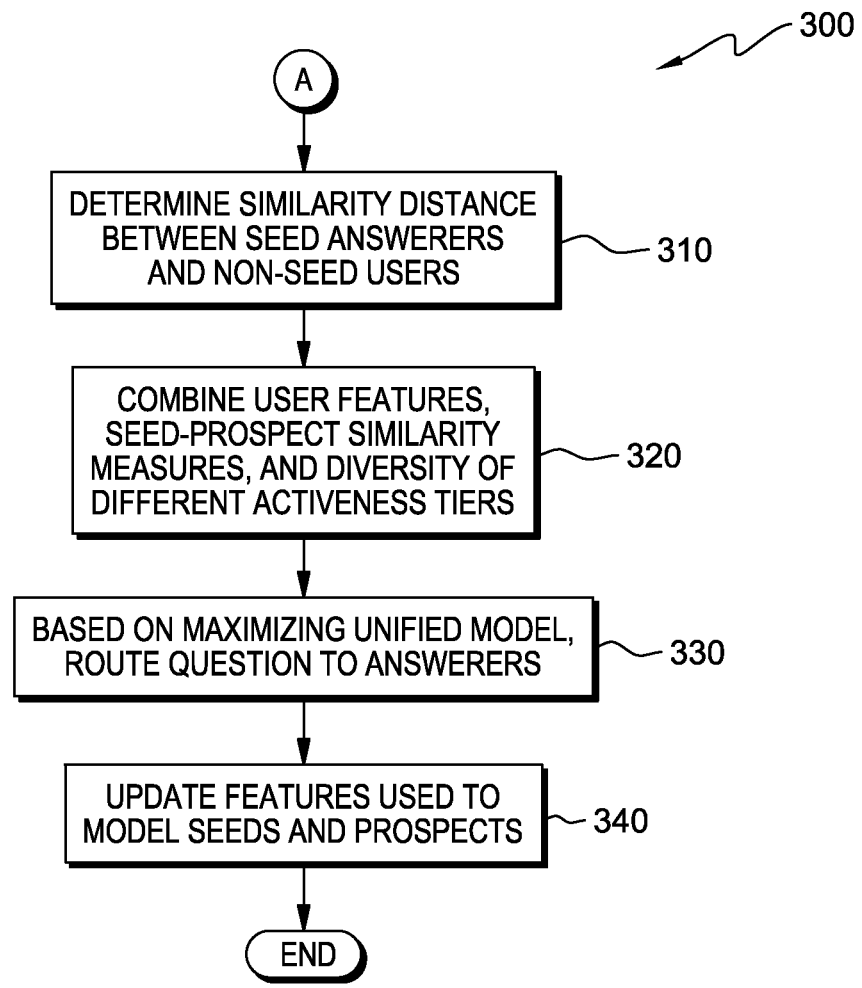
FIG. 3 is a flowchart depicting operational steps of a prospect growing program, on a server computer within the data processing environment of FIG. 1, in accordance with an embodiment of the present invention.

FIG. 3 is a flowchart depicting operational steps of prospect growing program 300, in accordance with an embodiment of the present invention. Having received the identification of at least one seed answerer for a question, prospect growing program 300 determines a similarity distance between the seed answerer and the non-seed users for the question (step 310). Prospect growing program 300 uses the modeling elements associated with the ability, willingness and readiness of a user to answer a question, discussed above, to perform a user-to-user similarity determination, in which one user is the seed answerer who is compared to each of the other users of the QA forum. The similarity is determined by calculating a distance between each user based on the elements. In one embodiment, the distance between a seed user (answerer) and another user is determined by calculating a Mahalanobis Distance, shown in equation (4).

$$D^2(x_i, x_j) = \|G(x_i - x_j)\|^2 = (x_i - x_j)^T A (x_i - x_j) \tag{4}$$

Where D is the distance and $x_i$ and $x_j$ represent the elements of the seed answerer and user respectively. The distance metric between the elements are denoted by matrix $A \in R^{m \times m}$. The elements of A can be learned using a distance metric learning method, such as supervised metric learning, using labeled metrics and enumerated content text within the title and detail of questions and answers of the QA forum data. This is facilitated by treating those users who answered the same questions as "positive" samples of the learning model, and those users who did not answer the same questions as "negative" samples.

Prospect growing program 300 calculates pair-wise similarity between the elements associated with and corresponding to, answerers of a question. The pair-wise similarity of the answerers is computed as linear combination of the distances between the elements included in determining ability, willingness and readiness of users. The linear weights of the elements are determined by a machine learning model, in which the users who answered the same questions are identified as "positive" samples of the learning model, and those users who did not answer the same questions are identified as "negative" samples. In one embodiment of the present invention, one way of determining the weight of a given element of the learning model is to simply count the number of "positive" user pairs whose difference in element value are very small, out of all "positive" user pairs, and use the frequency as the relative weights for computing the pair-wise similarity between answerers.

An objective function is applied that considers the distance, relative distance and aggregate distance constraints, previously determined and set, between the seed answerer and user, and prospect growing program 300 identifies users with a minimum distance from the seed answerer, indicating that the user has elements similar to those of the seed answerer, and may be considered a prospect answerer.

Prospect growing program 300 combines answerer elements, seed prospect similarity measures and the diversity of different activeness tiers (step 320). The elements associated with the level of ability, willingness and readiness, of a user to respond to a question, are combined with the measurement of user similarity to seed answerers, and the tier of activeness corresponding to the diversity of different activeness levels of users, are input to a unified model, depicted in equation (5) and operated to determine a maximum, thus identifying optimal answerers for the question, comprised of seed answerers and prospect answerers.

$$\operatorname*{argmax}_{u_{j_i}, s_l} \sum_{i=1}^{n} f(u_{j_i}, q) + \sum_{l=1}^{L} f(s_l, q) + \alpha \sum_{i=1}^{n} \min_{l=1 \ldots L} d(s_l, u_{j_i}) + \beta H(\{l_{j_l}, \ldots, l_{j_k}\}) \tag{5}$$

Equation (5) is a unified framework combining the modeling done for question—user similarity and user-user similarity. The equation includes the fitness-to-answer scoring function (f), measuring the fitness of a user (u) to answer a question (q); the distance function (d) measuring similarity distance between a seed answerer (s) and a user (u); the number of prospect seed answerers desired (L), and $\alpha$ and $\beta$ representing weighting coefficients controlling the amount of diversity in user elements considered, used to add randomness in the routing of the question to balance the distribution of questions. Both the distance function "d" and the fitness-to-answer function "f", can be learned based on a supervised learning scheme.

The pool of users may be partitioned into different groups taking into account their answering history, organization, readiness, and other elements previously discussed above, to further facilitate identification of seed and prospect answerers, and balance the volume of questions to answerers.

Prospect growing program 300 recommends, based on maximizing the unified model, routing the question to answerers (step 330). The unified model is optimized and identifies recommended prospect answerers from user pools, to which the question is routed. The question is also routed to seed answerers identified and used to determine the prospect answerer pool by determining similarity between the non-seed users and seed users. In one embodiment of the present invention, the selection of a seed answerer to use for element comparison with non-seed users may iterate until a desired number of prospect answerers with similar elements results. In another embodiment, prospect growing program 300 acknowledges a high level of questions routed to a seed answerer and recommends routing the question to prospect answerers and does not include seed answerers in the routing of the question.

Having routed the question to a final list of answerers and prospect answerers, prospect growing program 300 updates the elements used to model seeds and prospects, based on activity taken on the routing of the question (step 340). As seed answerers and prospect answerers respond to the routed question, or fail to respond, prospect growing program 300 updates the elements used to determine fitness or suitability of the user to answer a question, including ability to answer the question or provide a "best answer", willingness to answer a question, and readiness. The update of element data progresses the growth of prospect answerers and prospect seed answerers, as well as more firmly establishing existing seed answerers.

Having completed the update of elements used to model seeds and prospects, prospect growing program 300 ends.

Figure 4:
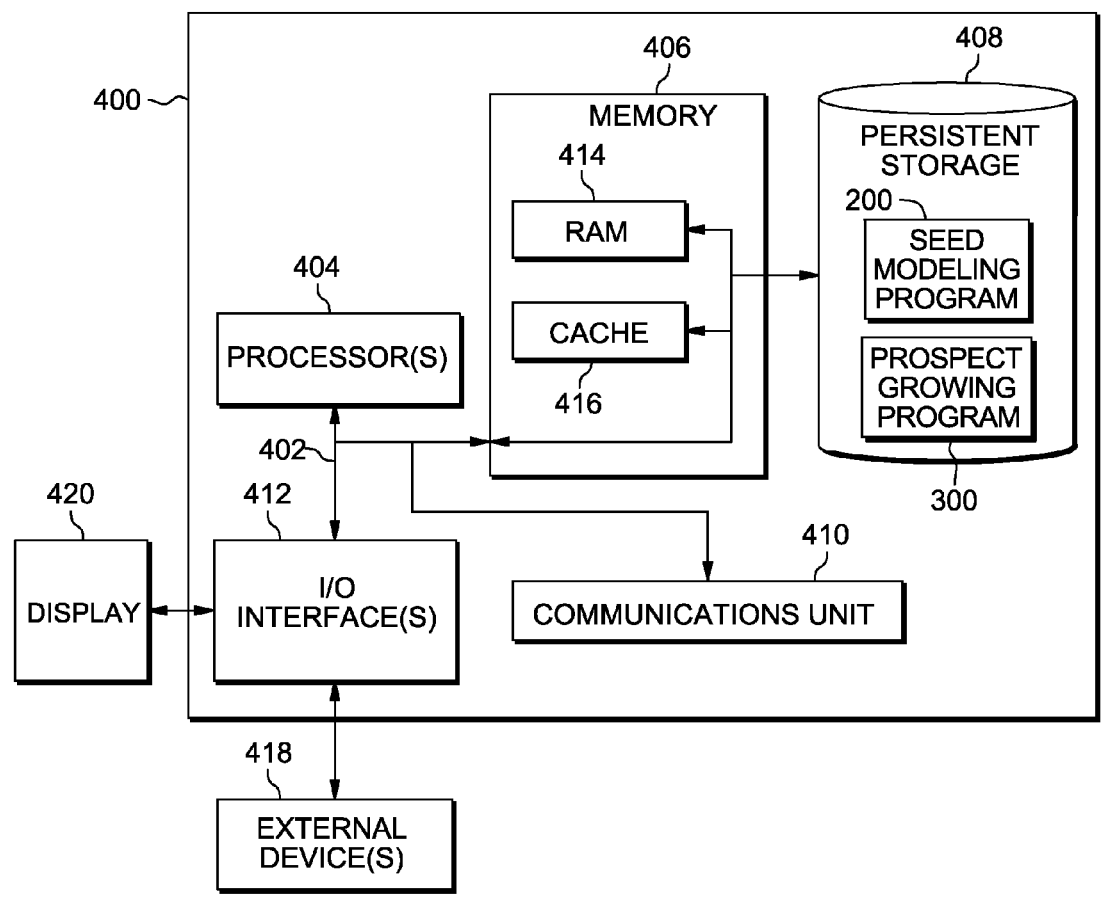
FIG. 4 depicts a block diagram of components of a server computer capable of performing the operations of a seed modeling program and a prospect growing program, in accordance with an embodiment of the present invention.

FIG. 4 depicts a block diagram of components of server computer 400, capable of performing the operations of seed modeling program 200 and prospect modeling program 300, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Server computer 400 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Seed modeling program 200 and prospect growing program 300 are stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of QA web server 120, QA database 160, non-QA database 170, and client device 110. In these examples, communications unit 410 includes one or more network interface cards. Communications unit 410 may provide communications through the use of either or both physical and wireless communications links. Seed modeling program 200 and prospect growing program 300 may be downloaded to persistent storage 408 through communications unit 410.

I/O interface(s) 412 allows for input and output of data with other devices that may be connected to server computer 102. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., seed modeling program 200 and prospect growing program 300, can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the FIGS. illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for identifying at least one prospect answerer for a question on a question-answer (QA) forum, the method comprising:

accessing, by one or more processors of a computing system, QA forum activity associated with users of a QA forum, wherein the QA forum activity contains historical questions, historical answers, and profiles, each having elements including QA forum information, and wherein the QA forum activity is associated with users of one or a combination of the QA forum and other QA forums;

accessing, by one or more processors of the computing system, historical online social activity corresponding to the users of the QA forum, each historical online social activity having elements including at least social activity information;

determining, by one or more processors of the computing system, based on performing a first similarity calculation, a similarity between elements of a question on the QA forum, and the elements of the QA forum activity associated with each of the users of the QA forum and the elements of the historical online social activity corresponding to each of the users of the QA forum;

selecting, by one or more processors of the computing system, based on results of the first similarity calculation, at least one user of the QA forum as an at least one model answerer, wherein elements associated with and corresponding to the at least one model answerer are similar to the elements of the question;

determining, by one or more processors of the computing system, based on performing a second similarity calculation, a similarity between the elements associated with and corresponding to each of the users of the QA forum other than the at least one model answerer, and the elements associated with and corresponding to the at least one model answerer; and identifying, by one or more processors of the computing system, based on results of the second similarity calculation, at least one prospect answerer amongst the users of the QA forum, wherein elements associated with and corresponding to the at least one prospect answerer are similar to the elements associated with and corresponding to the at least one model answerer.

2. The method of claim 1, further comprising:
routing, by one or more processors of the computing system, the question to one or a combination of the at least one model answerer and the at least one prospect answerer based on constraint weights to balance the distribution of questions to answerers, wherein the constraint weights are determined based on the elements of the QA forum activity associated with the users of the QA forum and the elements of the historical online social activity corresponding to the users of the QA forum.

3. The method of claim 1, wherein performing the second similarity calculation further comprises:
performing, by one or more processors of the computing system, a supervised metric learning technique for a question type to produce one or more similarity constraints used to determine a distance between each element associated with each user of the QA forum and a corresponding element of the at least one model answerer.

4. The method of claim 1, wherein determining, based on performing the first similarity calculation, the similarity between elements of the question on the QA forum, and the elements of the QA forum activity associated with each of the users of the QA forum and the elements of the historical online social activity corresponding to each of the users of the QA forum, comprises:
performing, by one or more processors of the computing system, modeling of the elements of the QA forum activity associated with each of the users of the QA forum and the elements of the historical online social activity corresponding to each of the users of the QA forum, based on the ability, willingness, and readiness of each user to answer the question.

5. The method of claim 1, wherein determining, based on performing the first similarity calculation, the similarity between the elements of the question on the QA forum and the elements of the QA forum activity associated with each of the users of the QA forum and the elements of the historical online social activity corresponding with each of the users of the QA forum, comprises:
determining, by one or more processors of the computing system, an ability of a user to answer the question of the QA forum based at least in part, on a number of questions answered, a number of best answers provided, and a topic of each question answered;
determining, by one or more processors of the computing system, the willingness of the user to answer the question based at least in part on the number of questions answered by the user and the number of best answers provided by the user and a number of events of posting, commenting, and tagging on non-QA social media sites; and
determining, by one or more processors of the computing system, the readiness of the user to answer the question based at least in part, on an availability status of the user, a number of questions routed to the user, and a workload of the user.

6. The method of claim 1, further comprising:
identifying, by one or more processors of the computing system, based on the results of the second similarity calculation, the at least one prospect answerer for the question, wherein the second similarity calculation is performed using elements of the profiles associated with the users of the QA forum and the elements of the historical online social activity corresponding to each of the users of the QA forum, wherein the elements of the profiles and the elements of the historical online social activity are used in an absence of the elements of the historical questions and the elements of the historical answers for the users of the QA forum.

7. The method of claim 1, further comprising:
selecting, by one or more processors of the computing system, based on an optimization function, answerers to which the question is routed, wherein the optimization function includes combining a function of the results of the first similarity calculation, a function of the results of the second similarity calculation, and weighting coefficients of constraints to control a randomness of routing questions amongst the at least one model answerer selected and the at least one prospect answerer identified, wherein the constraints are based on the elements of the QA forum activity and the elements of the historical online social activity.

8. The method of claim 1, wherein performing the first similarity calculation comprises:
comparing, by one or more processors of the computing system, the elements of the question on the QA forum to the elements of the QA forum activity associated with the users of the QA forum and the elements of the historical online social activity corresponding to the users of the QA forum; and
determining, by one or more processors of the computing system, a value based on a comparison of the elements of the question on the QA forum, to the elements associated with and corresponding to the users of the QA forum, wherein the value represents a level of matching based on the comparison.

9. The method of claim 1, wherein performing the second similarity calculation comprises:
comparing, by one or more processors of the computing system, a similarity of the elements associated with and corresponding to the users of the QA forum and the elements associated with and corresponding to the at least one model answerer; and
determining, by one or more processors of the computing system, a value based on results of a comparison of the elements associated with and corresponding to the users of the QA forum, to the elements associated with and corresponding to the at least one model answerer, wherein the value represents a level of matching based on the comparison.

10. A computer program product for identifying at least one prospect answerer for a question on a question-answer (QA) forum, the computer program product comprising a computer-readable storage medium having computer readable program code embodied therewith, the computer readable program code comprising:
computer readable program code configured to access QA forum activity associated with users of a QA forum, wherein the QA forum activity contains historical questions, historical answers, and profiles, each having elements including QA forum information, and wherein the QA forum activity is associated with users of one or a combination of the QA forum and other QA forums;

computer readable program code configured to access historical online social activity corresponding to the users of the QA forum, each historical online social activity having elements including at least social activity information;

computer readable program code configured to determine, based on performing a first similarity calculation, a similarity between elements of a question on the QA forum, and the elements of the QA forum activity associated with each of the users of the QA forum and the elements of the historical online social activity corresponding to each of the users of the QA forum;

computer readable program codes configured to select, based on results of the first similarity calculation, at least one user of the QA forum as an at least one model answerer, wherein elements associated with and corresponding to the at least one model answerer are similar to the elements of the question;

computer readable program code configured to determine, based on performing a second similarity calculation, a similarity between the elements associated with and corresponding to each of the users of the QA forum other than the at least one model answerer, and the elements associated with and corresponding to the at least one model answerer; and computer readable program code configured to identify, based on results of the second similarity calculation, at least one prospect answerer amongst the users of the QA forum, wherein elements associated with and corresponding to the at least one prospect answerer are similar to the elements associated with and corresponding to the at least one model answerer.

11. The computer program product of claim 10, further comprising:

computer readable program code to route the question to one or a combination of the at least one model answerer and the at least one prospect answerer based on constraint weights to balance the distribution of questions to answerers, wherein the constraint weights are determined based on the elements of the QA forum activity associated with the users of the QA forum and the elements of the historical online social activity corresponding to the users of the QA forum.

12. The computer program product of claim 10, wherein performing the second similarity calculation comprises:

performing a supervised metric learning technique for a question type to produce one or more similarity constraints used to determine a distance between each element associated with each user of the QA forum and a corresponding element of the at least one model answerer.

13. The computer program product of claim 10, wherein the computer readable program code to compare, based on performing the first similarity calculation, a similarity between the elements of the question on the QA forum to the elements of the QA forum activity and the elements of the historical online social activity, associated with each of the users, comprises:

computer readable program code configured to determine an ability of a user to answer the question of the QA forum based at least in part, on a number of questions answered, a number of best answers provided, and a topic of each question answered;

computer readable program code configured to determine the willingness of the user to answer the question based at least in part on the number of questions answered by the user and the number of best answers provided by the user and the number of events of posting, commenting, and tagging on non-QA sites; and computer readable program code configured to determine a readiness of the user to answer the question based at least in part, on an availability status of the user, a number of questions routed to the user, and a workload of the user.

14. The computer program product of claim 10, further comprising:

computer readable program code configured to identify, based on the results of the second similarity calculation, the at least one prospect answerer for the question, wherein the second similarity calculation is performed using elements of the profiles associated with the users of the QA forum and the elements of the historical online social activity corresponding to each of the users of the QA forum, wherein the elements of the profiles and the elements of the historical online social activity are used in an absence of the elements of the historical questions and an absence of the elements of the historical answers for the users of the QA forum.

15. The computer program product of claim 10, further comprising:

computer readable program code configured to select, based on an optimization function, answerers to which the question is routed, wherein the optimization function includes combining a function of the results of the first similarity calculation, a function of the results of the second similarity calculation, and weighting coefficients of constraints to control a randomness of routing questions amongst the at least one model answerer selected and the at least one prospect answerer identified, wherein the constraints are based on the elements of the QA forum activity and the elements of the historical online social activity.

16. The computer program product of claim 10, wherein performing the first similarity calculation comprises:

computer readable program code configured to compare the elements of the question on the QA forum to the elements of the QA forum activity associated with the users of the QA forum and the elements of the historical online social activity corresponding to the users of the QA forum; and computer readable program code configured to determine a value based on a comparison of the elements of the question on the QA forum, to the elements associated with and corresponding to the users of the QA forum, wherein the value represents a level of matching based on the comparison.

17. The computer program product of claim 10, wherein performing the second similarity calculation comprises:

computer readable program code configured to compare a similarity of the elements associated with and corresponding to the users of the QA forum and the elements associated with and corresponding to the at least one model answerer; and determining a value based on results of a comparison of the elements associated with and corresponding to the users of the QA forum, to the elements associated with and corresponding to the model answerer, wherein the value represents a level of matching based on the comparison.

18. A computer system for identifying at least one prospect answerer for a question-answer (QA) forum, the computer system comprising:

one or more computer processors;

one or more computer-readable storage media, wherein the one or more computer readable storage media stores program code, comprising:

computer readable program code configured to access QA forum activity associated with users of a QA forum, wherein the QA forum activity contains historical questions, historical answers, and profiles, each having elements including QA forum information, and wherein the QA activity is associated with users of one or a combination of the QA forum and other QA forums;

computer readable program code configured to access historical online social activity corresponding to the users of the QA forum, each historical online social activity having elements including at least social activity information;

computer readable program code configured to determine, based on performing a first similarity calculation, a similarity between elements of a question on the QA forum, and the elements of the QA forum activity associated with each of the users of the QA forum and the elements of the historical online social activity corresponding to each of the users of the QA forum;

computer readable program codes configured to select, based on results of the first similarity calculation, at least one user of the QA forum as an at least one model answerer, wherein elements associated with and corresponding to the at least one model answerer are similar to the elements of the question;

computer readable program code configured to determine, based on performing a second similarity calculation, a similarity between the elements associated with and corresponding to each of the users of the QA forum other than the at least one model answerer, and the elements associated with and corresponding to the at least one model answerer; and computer readable program code configured to identify, based on results of the second similarity calculation, at least one prospect answerer amongst the users of the QA forum, wherein elements associated with and corresponding to the at least one prospect answerer are similar to the elements associated with and corresponding to the at least one model answerer.

* * * * *